United States Patent
Choi

(10) Patent No.: US 9,835,857 B2
(45) Date of Patent: Dec. 5, 2017

(54) HIGH BRIGHTNESS HEAD-UP DISPLAY DEVICE

(71) Applicant: Hae-yong Choi, Seoul (KR)

(72) Inventor: Hae-yong Choi, Seoul (KR)

( * ) Notice: Subject to any disclaimer, the term of this patent is extended or adjusted under 35 U.S.C. 154(b) by 204 days.

(21) Appl. No.: 14/612,439

(22) Filed: Feb. 3, 2015

(65) Prior Publication Data

US 2015/0241694 A1    Aug. 27, 2015

(30) Foreign Application Priority Data

Feb. 25, 2014   (KR) .......................... 10-2014-0022150

(51) Int. Cl.
   *G02B 27/14*      (2006.01)
   *G02B 27/01*      (2006.01)

(52) U.S. Cl.
   CPC .. *G02B 27/0101* (2013.01); *G02B 2027/0118* (2013.01)

(58) Field of Classification Search
   CPC ............ G02B 27/0172; G02B 27/0101; G02B 27/0118; G02B 27/0123
   USPC .................................................. 359/629–639
   See application file for complete search history.

(56) References Cited

U.S. PATENT DOCUMENTS

| | | | | |
|---|---|---|---|---|
| 7,952,059 B2 * | 5/2011 | Vitale | .................... | G03B 21/28 250/208.1 |
| 8,570,651 B1 * | 10/2013 | Choi | ...................... | G03B 21/60 359/443 |
| 2010/0214635 A1 * | 8/2010 | Sasaki | ................ | G02B 27/0101 359/15 |
| 2011/0074657 A1 * | 3/2011 | Sugiyama | .......... | G02B 27/0101 345/7 |
| 2014/0267402 A1 * | 9/2014 | Hing | ...................... | G02B 27/01 345/633 |
| 2015/0108782 A1 * | 4/2015 | Chou | .................. | G02B 27/0101 296/90 |
| 2015/0153575 A1 * | 6/2015 | Komatsu | ............ | G02B 27/0172 345/8 |

FOREIGN PATENT DOCUMENTS

| | | |
|---|---|---|
| KR | 10-1989-0012409 | 8/1989 |
| KR | 10-1990-0013480 | 8/1990 |
| KR | 10-2006-0040622 | 5/2006 |
| KR | 10-2008-0001688 | 1/2008 |

(Continued)

*Primary Examiner* — Bumsuk Won
*Assistant Examiner* — Tamara Y Washington
(74) *Attorney, Agent, or Firm* — Bacon & Thomas, PLLC

(57) ABSTRACT

A high brightness head-up display device where a spherical half-transparent mirror is provided on an upper end of a case, a projector unit is provided on a lower end thereof, and a spherical reflection screen is provided on a front of the projector unit. A projection distance of the projector unit corresponds to a focal distance of the spherical reflection screen and the spherical half-transparent mirror is provided on a front of the spherical reflection screen where a reflection rate of the spherical reflection screen is 2-80% and the interval between spherical reflection screen and the spherical half-transparent mirror is disposed at a focal distance of the spherical half-transparent mirror. A shielding film is attached to a rear of the spherical half-transparent mirror, which shields external light and permits 80% of light to be transmitted to outside from inside.

6 Claims, 10 Drawing Sheets

(56) References Cited

FOREIGN PATENT DOCUMENTS

| KR | 10-2008-0070015 | 7/2008 |
| KR | 10-2008-0103695 | 10/2008 |
| KR | 10-1319587 B1 | 10/2013 |

* cited by examiner

HIGH BRIGHTNESS HEAD-UP DISPLAY DEVICE

CROSS-REFERENCE(S) TO RELATED APPLICATION

This application claims under 35 U.S.C. §119(a) the benefit of Korean Patent Application No. 10-2014-0022150 filed on Feb. 25, 2014, which is incorporated by reference herein in its entirety.

BACKGROUND OF THE INVENTION

Field of the Invention

The present invention relates to a high brightness head-up display device that is provided on a front of a driver's seat for a vehicle, and more particularly, to a high brightness head-up display device in which a reflection type screen having high brightness is provided on a front of a projector and a film for shielding external light is provided on a rear of the reflection type screen or a vehicle window.

Description of the Related Art

In general, according to a related art of a head-up display device disclosed in Korean Patent Registration No. 10-1319587, the image of a projection unit 200 is projected on a combiner 100 formed with curved surface or remaining image is reflected on a front window of a vehicle. Here, the combiner is a half mirror structure through which a part of the image is transmitted and a part thereof is reflected.

Further, according to a related art of a conventional display device using a projection unit 200 as a projector, an image is projected on a general screen and the image projected on the screen is reflected on a vehicle window.

However, according to the related arts described in the forgoing, the image reflected on the vehicle window is exposed to external light so that brightness thereof is reduced and thus it is impossible to view the image at daytime.

The related arts disclosed in Korean Patent Application Nos. 10-2007-017456, 10-1990-0013480, 10-2008-0001688, 10-1989-0012409, 10-2008-0070015, 10-2006-0040622, and 10-2008-0103695 relate to a display device where the image on a monitor is reflected on a glass window and the remaining image is viewed. However, the image is cloudy so that it is not practical.

REFERENCES OF THE RELATED ART

Patent Document (Patent Document 1) Korean Patent Application No. 10-2007-017456
(Patent Document 2) Korean Patent Application No. 10-1990-0013480
(Patent Document 3) Korean Patent Application No. 10-2008-0001688
(Patent Document 4) Korean Patent Application No. 10-1989-0012409
(Patent Document 5) Korean Patent Application No. 10-2008-0070015
(Patent Document 6) Korean Patent Application No. 10-2006-0040622
(Patent Document 7) Korean Patent Application No. 10-2008-0103695

The description provided above as a related art of the present invention is just for helping in understanding the background of the present invention and should not be construed as being included in the related art known by those skilled in the art.

SUMMARY OF THE INVENTION

According to the related art described in the forgoing, an image is reflected on a transparent glass window and the remaining image is to be viewed, however, the image becomes cloudy when sunlight is irradiated directly to the glass window during a daytime driving or outer environment is bright so that it is almost impossible to use the display device.

By using a display device in which a general screen and a spherical half-mirror are provided on a front of a projector, the image brightness is low and thus it is impossible to use the device. That is, in a case of a general reflection screen, a spot phenomenon occurs, in which a part of a screen to be viewed brightly when a reflection rate of the screen is increased, so that the reflection rate cannot be increased to 2% or more.

Accordingly, a major technical problem to be solved by the present invention relates to increasing brightness of the image to be projected on a window under sunlight and external light incident on the window to some extent.

In the high brightness head-up display device of the present invention, a screen may be configured as a spherical reflection screen having a curvature of a concave shape wherein the focal distance of the spherical reflection screen corresponds to a projection distance of a projector unit wherein a surface reflection rate of the screen is 2-80%.

Further, a shielding film may be arranged on a proper location so as to shield external light and permit light to be transmitted from outside to inside.

That is, the high brightness head-up displaying device of the present invention may be provided with a projection unit 1, a spherical reflection screen and a spherical half-transparent mirror wherein the spherical reflection screen has a curvature radius R and is disposed within 30% of a projection distance D1 of the projector unit 1 and a focal distance of the spherical reflection screen 2 having the curvature radius R.

A surface reflection rate of the spherical reflection screen 2 may be 2-80% and the surface thereof may be formed as a reflection surface of a metal white color using aluminum, stainless steel, nickel or the like.

The spherical reflection screen 2 may be disposed at a focal distance of the spherical half-transparent mirror 3.

BRIEF DESCRIPTION OF THE DRAWINGS

The above and other aspects, features and advantages of certain exemplary embodiments of the present invention will be more apparent from the following description taken in conjunction with the accompanying drawings, in which.

Figure 1:
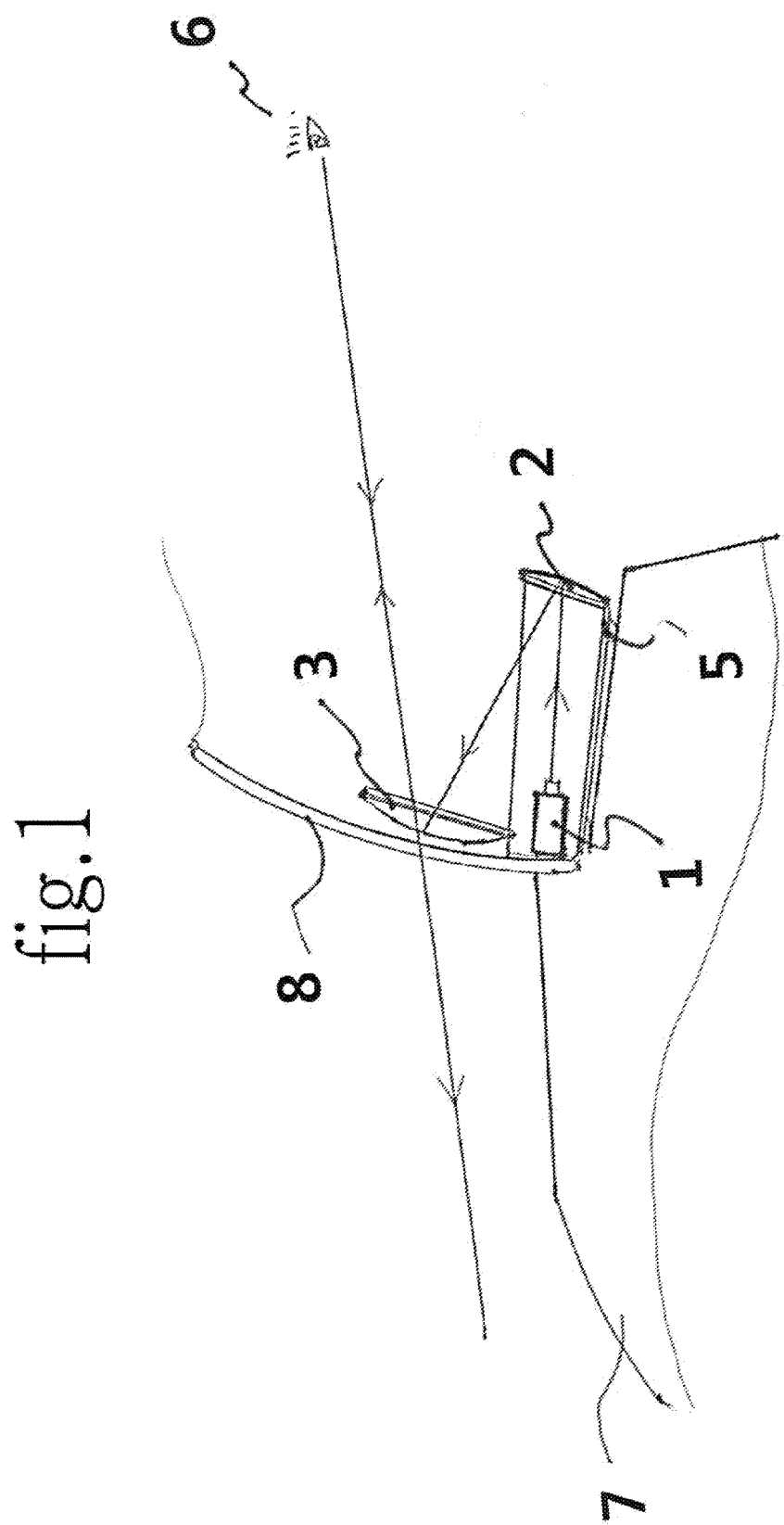
FIG. 1 is a perspective view illustrating a head-up display device according to an embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Exemplary embodiments of the present invention will be described below in detail with reference to the accompanying drawings. Wherever possible, the same reference numerals will be used to refer to the same elements throughout the specification, and a duplicated description thereof will be omitted.

Figure 2:
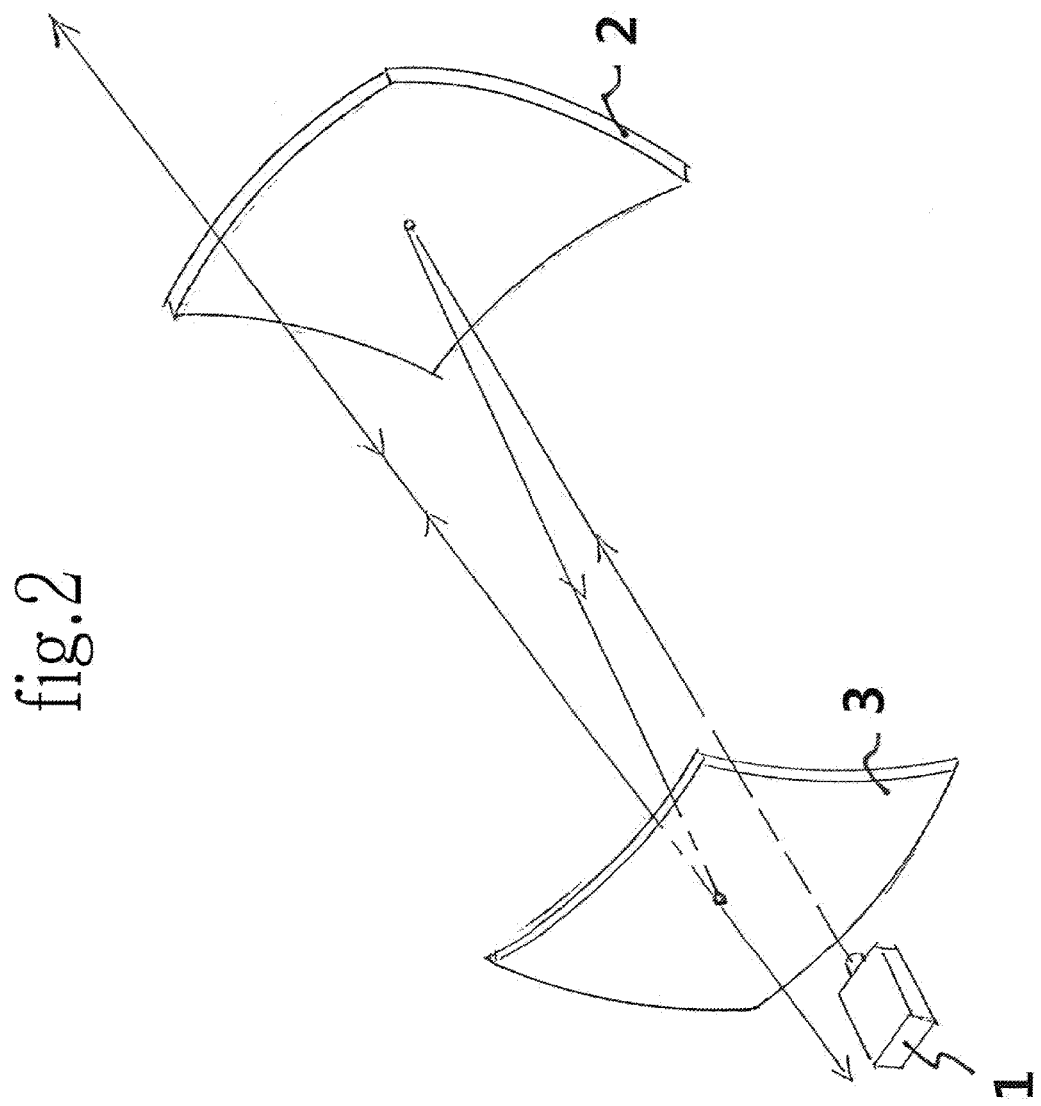
FIG. 2 is a view illustrating an operation of a high brightness head-up display device according to an embodiment of the present invention.

As shown in FIGS. 1 and 2, a high brightness head-up display device according to an embodiment of the present invention may include: a projector unit 1 provided on a front of a vehicle window 8 on an upper surface of a dash board 7 of a vehicle; a spherical half-transparent mirror 3 through which a part of image is transmitted and a part thereof is reflected, provided above the projector unit; and a spherical reflection screen 2 provided a front of the projector unit 1.

Here, the interval and location of the respective component are determined optically so as to fix the projector unit 1, the spherical half-transparent mirror 3 and the spherical reflection screen 2 within one case 5.

Figure 3:
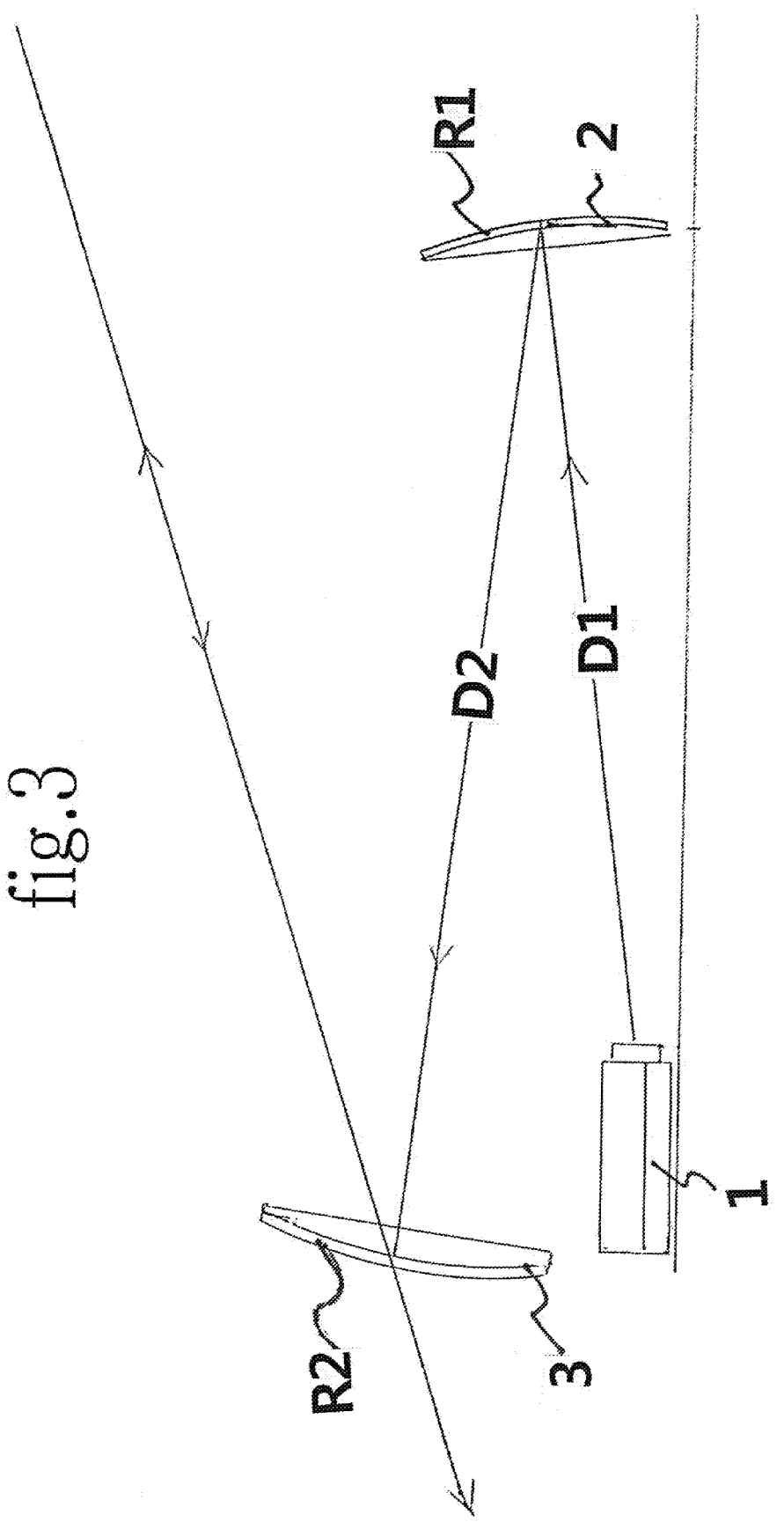
FIG. 3 is a view illustrating an optical operation of a high brightness head-up display device according to an embodiment of the present invention.

That is, as shown in FIG. 3, a projection distance D1 of the spherical reflection screen 2 from a projection lens of the projector unit 1 (Hereinafter, referred to as "D1") to the spherical reflection screen 2 and a spherical curvature radius R1 of the spherical reflection screen 2 (Hereinafter, referred to as "R1") satisfy the relation of R1=2×D1.

Further, a spherical curvature radius R2 of the spherical half-transparent mirror 3 (Hereinafter, referred to as "R2") and a distance D2 from the spherical reflection screen 2 to the spherical half-transparent mirror 3 (Hereinafter, referred to as "D2") satisfy a relation of D2=R2/2.

That is, when a spherical body of a focal distance F has a curvature radius R, F=R/2 and thus when the reflection screen is provided at a focal point of the spherical half-transparent mirror 3 and the projector unit is provided at a focal point of the reflection screen having a curvature R1, the projection distance D1 of the projector unit 1 corresponds to R1/2. In other words, the projection distance D1 of the projector unit 1 corresponds to a focal distance of a spherical reflection screen 2 having a curvature radius R1 and the distance D2 between the spherical reflection screen 2 and the spherical half-transparent mirror 3 corresponds to a focal distance of the spherical half-transparent mirror 3 having a curvature radius R2.

For example, according to a preferred embodiment of the present invention D1 may be 50 mm, R1 may be 100 mm, D2 may be 120 mm, and R2 may be 240 mm.

However, it has to be understood that the numerals are given assuming that a reflection rate of the spherical reflection screen 2 is 100%, and when the reflection rate of the spherical reflection screen 2 is 2%, it has same effect to an error range of about 30% with respect to the correspondence between the projection distance D1 of the projector unit 1 and the focal distance of the spherical reflection screen 2 having a curvature radius R1.

That is, when the reflection rate of the spherical reflection screen 2 is 2%, the hot spot phenomenon is not offensive visually, however when the reflection rate of the spherical reflection screen 2 is 80%, it has to be precise and thus the error range needs to be within 5% so as not to produce the hot spot phenomenon.

Accordingly, according to the present invention, the error range with respect to the correspondence between the projection distance D1 of the projector unit 1 and the focal distance of the spherical reflection screen 2 having a curvature radius R1 may be 5-30%, not limited thereto.

Though this optical configuration of the present invention the image projected to the spherical reflection screen 2 from the projector unit 1 is reflected at a reflection rate of 2-80% on the spherical reflection screen 2 wherein a very bright image can be viewed on an even bright picture without hot spot even when the spherical reflection screen 2 has a high reflection rate.

Further, the image on the spherical reflection screen 2 is disposed at a focal point of the spherical half-transparent mirror 3 and thus the spherical half-transparent mirror 3 magnifies only the image on the spherical reflection screen 2 at the focal point thereof and diffuses the other images that are disposed to be deviated from the focal point, thereby increasing brightness of the image.

The reflection rate to a transmission rate of the spherical half-mirror 3 may be 80%: 20% or 20%: 80% depending on usage of the mirror, which may be added or deducted based on 50%: 50%.

Here, in order to obtain the performance described in the forgoing it is very important to configure a surface reflection rate of the spherical reflection screen 2.

Figure 4:
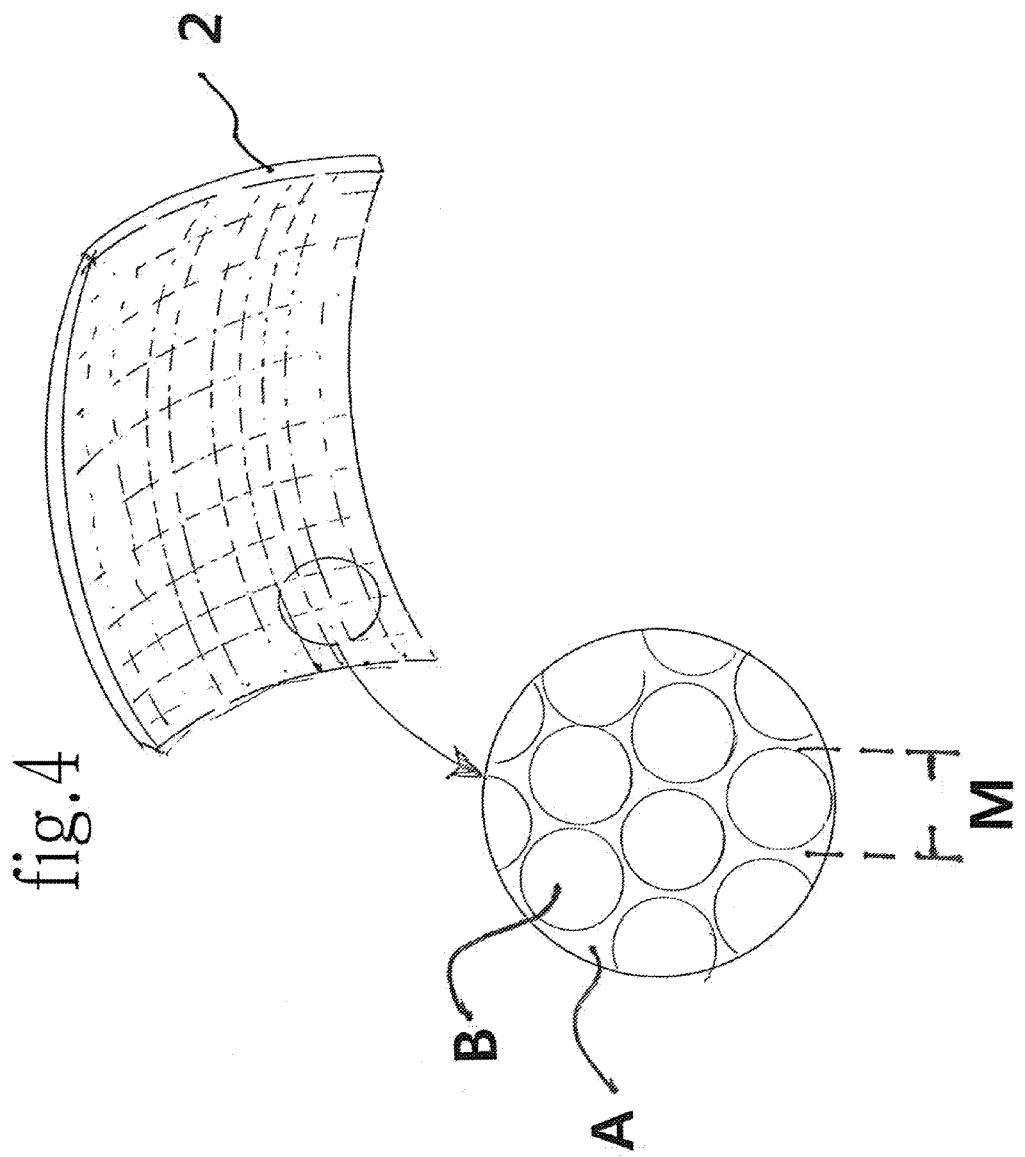
FIG. 4 is a view illustrating a surface reflection rate of a spherical reflection screen according to an embodiment of the present invention.

That is, as shown in FIG. 4, the screen is made of white material such as aluminum, stainless steel, silver or the like and the particle degree M on the surface thereof is in a range of 60-6,000 mesh.

The reflection rate of the screen may be varied depending on a hardness of a surface thereof wherein the reflection rate is 2-10% at a particle degree M of 60-80 mesh, the reflection rate is 10-40% at a particle degree M of 800-1500 mesh, which is increased proportionally to the particle degree, and the reflection rate is 40-80% at a particle degree M of 1,500-6,000 mesh.

The surface particle degree of the screen serves to determine majorly resolution of the image, however the reflection rate of the screen may be varied depending on not only the surface particle degree but also a reflection surface of the screen, material hardness thereof, and thus the design of the screen is to be made considering the facts described in the forgoing.

Here, the surface of the screen may be made of various materials, for example, when a surface of aluminum foil is rolled using a roller, the reflection rate of the surface can be adjusted by the roller, and when the surface of the screen is made of metal such as stainless, the surface of the screen may be corroded through mesh of the particle degree. Further, when the surface of the screen is made of steel, copper or an alloy thereof, the surface particle degree is given as a surface particle degree M and then the surface is treated with chrome, silver and other white metals.

Further, a surface of the spherical reflection screen 2 consisting of metal may be compressed to adjust the surface particle degree to have a proper reflection rate and then the surface can be chemically-treated such as anodizing, oxidizing, or treatment with chrome or nickel, or the spherical form thereof is injected with plastic and the surface is treated to have a proper reflection rate and then coated with aluminum.

Figure 5:
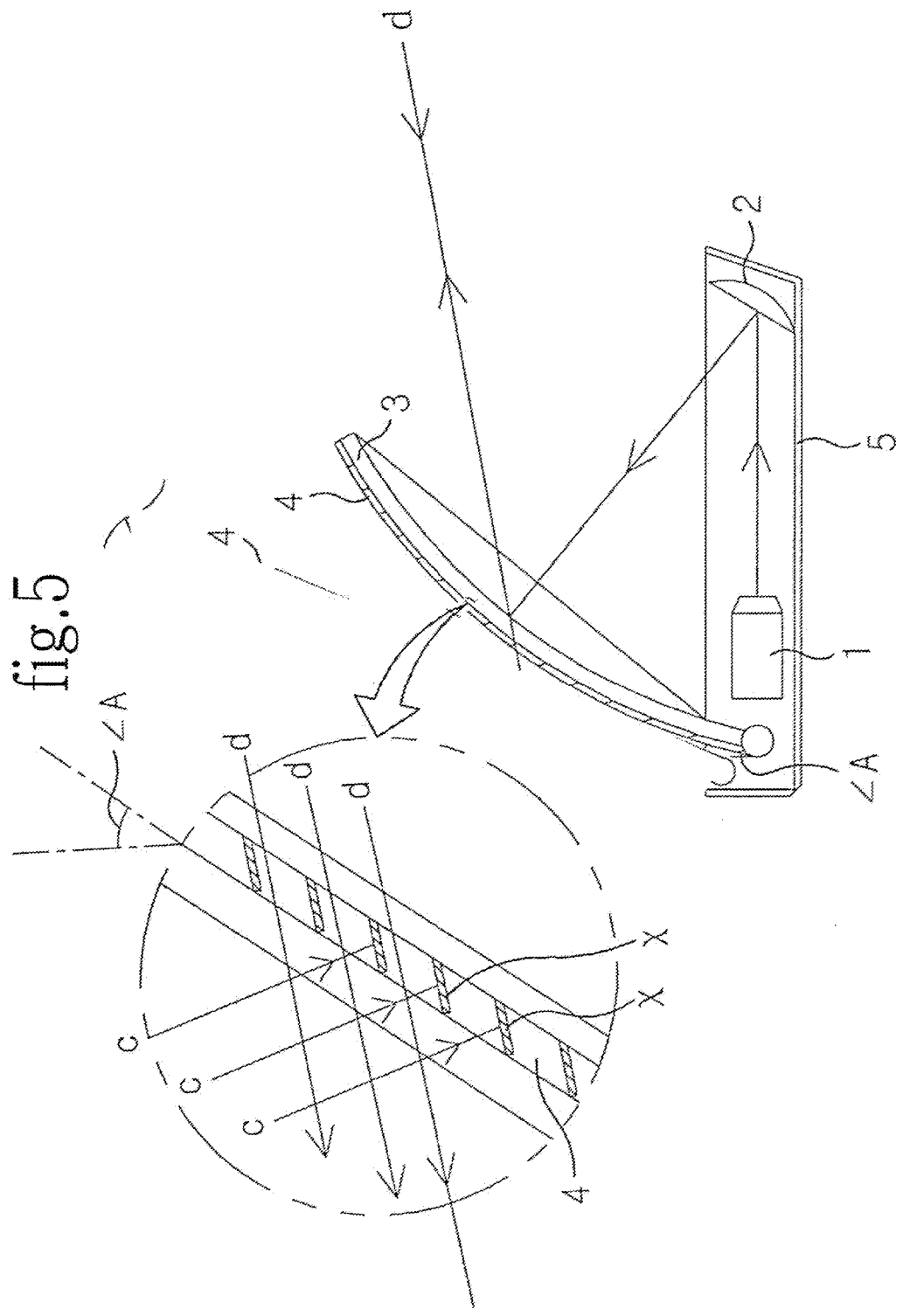
FIG. 5 is a view illustrating a shielding film that is attached on a spherical reflection screen and a rear surface of the spherical reflection screen according to an embodiment of the present invention.

Meanwhile, as shown in FIG. 5, a shielding film 4 is provided on a rear of a spherical half-transparent mirror 3 and 80% or more of external view angle d of a driver 6 is transmitted through the spherical half-transparent mirror 3. That is, the prisms on a surface of the shielding film 4 are arranged in parallel to the external view angle d and the external light c incident to the spherical half-reflection mirror 3 through external window of a vehicle is reflected through the prisms provided on a surface of the shielding film provided with a reflection surface A, thereby shielding the external light c.

Embodiment 1

As shown in FIG. 1, when a spherical reflection screen is configured to have a reflection rate of 2-80%, the brightness of the screen is increased to 2-80 times as compared to a conventional screen having a reflection rate of 1%.

Embodiment 2

When a shielding film 4 is connected to a rear of the spherical half-transparent mirror 3 configured as shown in FIG. 1, as shown in FIG. 5, the external light c is shielded and 80% of light is transmitted, thereby increasing brightness of image 4 times or more due to the shielding of external light.

Embodiment 3

As shown in FIG. 1, when the spherical reflection screen 2 having a reflection rate of 2-80% and the spherical half-reflection mirror 3 to which the shielding film 4 which shields external light and through which 50% or more of light is transmitted is connected are provided, the brightness of image is increased to a total of 320 times at a maximum level wherein the brightness is increased to 2-80 times at the spherical reflection screen 2 and it is increased to 4-8 times at a maximum level at the spherical half-transparent mirror 3.

Embodiment 4

The shielding film 4 as described in the forgoing may be attached to a rear of the spherical half-transparent mirror 3, as shown in FIG. 5.

Figure 6:
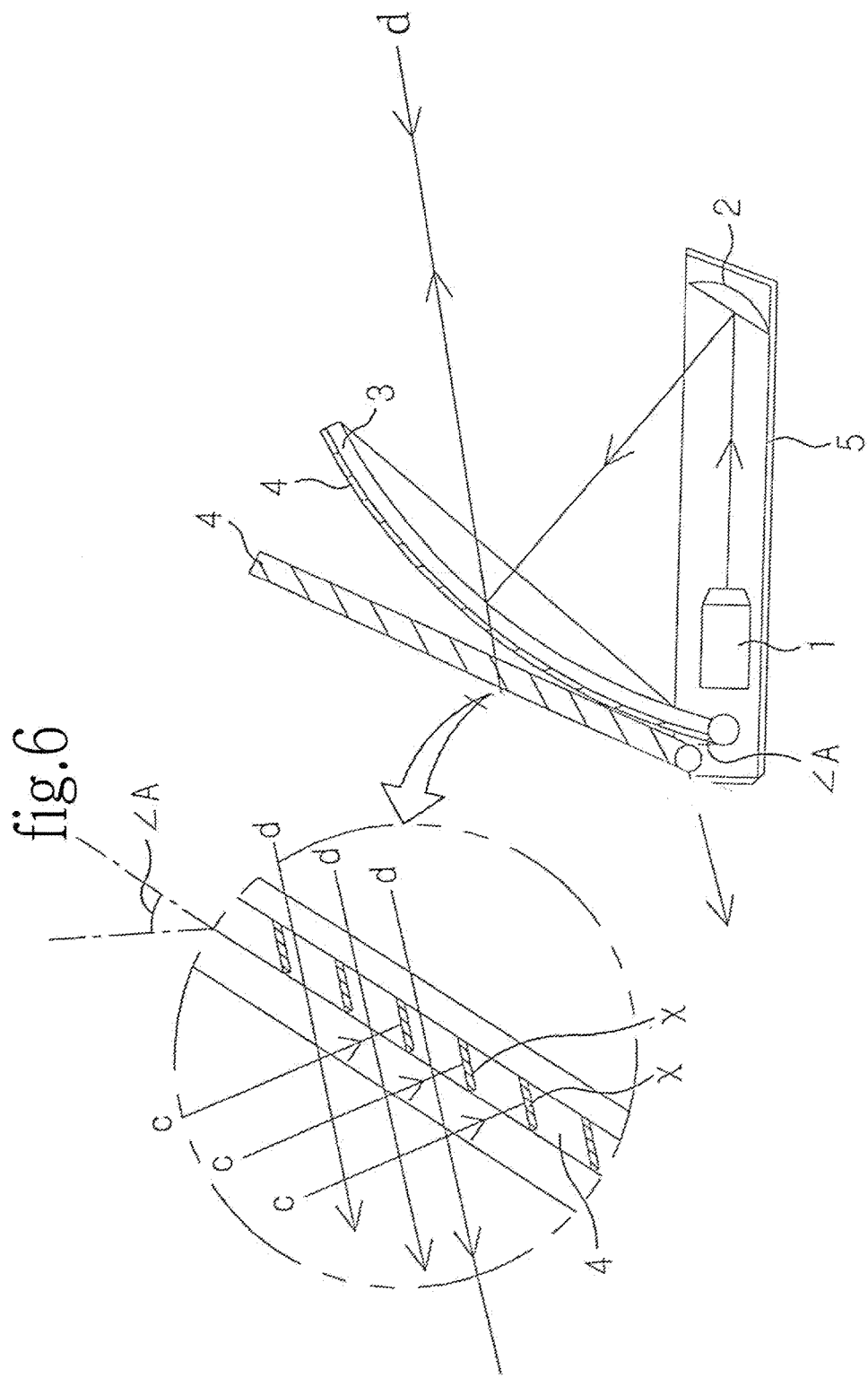
FIG. 6 is a view illustrating a shielding film that is provided separately according to an embodiment of the present invention.

Further, as shown in FIG. 6, the shielding film 4 may be provided separately with a separate angle adjusting device and when a reflection angle of the spherical reflection screen 2 is not corresponded to the external light incident from an outside of a vehicle, the shielding angle of the shielding film 4 may be adjusted.

According to the present invention, as shown in FIGS. 5 and 6, when the shielding film 4 is provided at a request inclined angle <A, the external light shielding surface X is in parallel to the installation angle of the shielding film and becomes a reflection surface or dark color so that the external light c incident from an outside of a vehicle is absorbed or reflected and the view angle d of a driver inside in parallel to the request inclined angle <A is transmitted itself, thereby viewing outside.

That is, when the external light shielding surface x of the shielding film 4 is formed at 30° based on the horizontal shielding film, the shielding film 4 needs to be arranged at the same angle of 30°. The area of the external light shielding surface x is 20-50% of a total area of the shielding film such that 50-80% or more of the external light incident at the request inclined angle <A is absorbed and the transmission rate from an inside to an outside of a vehicle is 50-80% or more. Here, the shielding film 4 needs to be arranged at the fixed inclined angle <A as described in the forgoing such that the external light is absorbed through the external light shielding surface x and the view angle d of a driver is transmitted therethough, and thus the request inclined angle <A is important.

Accordingly, as shown in FIG. 6, when the shielding film 4 is attached to a rear of the spherical half-transparent mirror 3, a reflection angle of the spherical half-transparent mirror 3 and an arrangement angle of the shielding film 4 may be different, and thus the shielding film 4 may be rotated to fix the arrangement angle.

Embodiment 5

Figure 7:
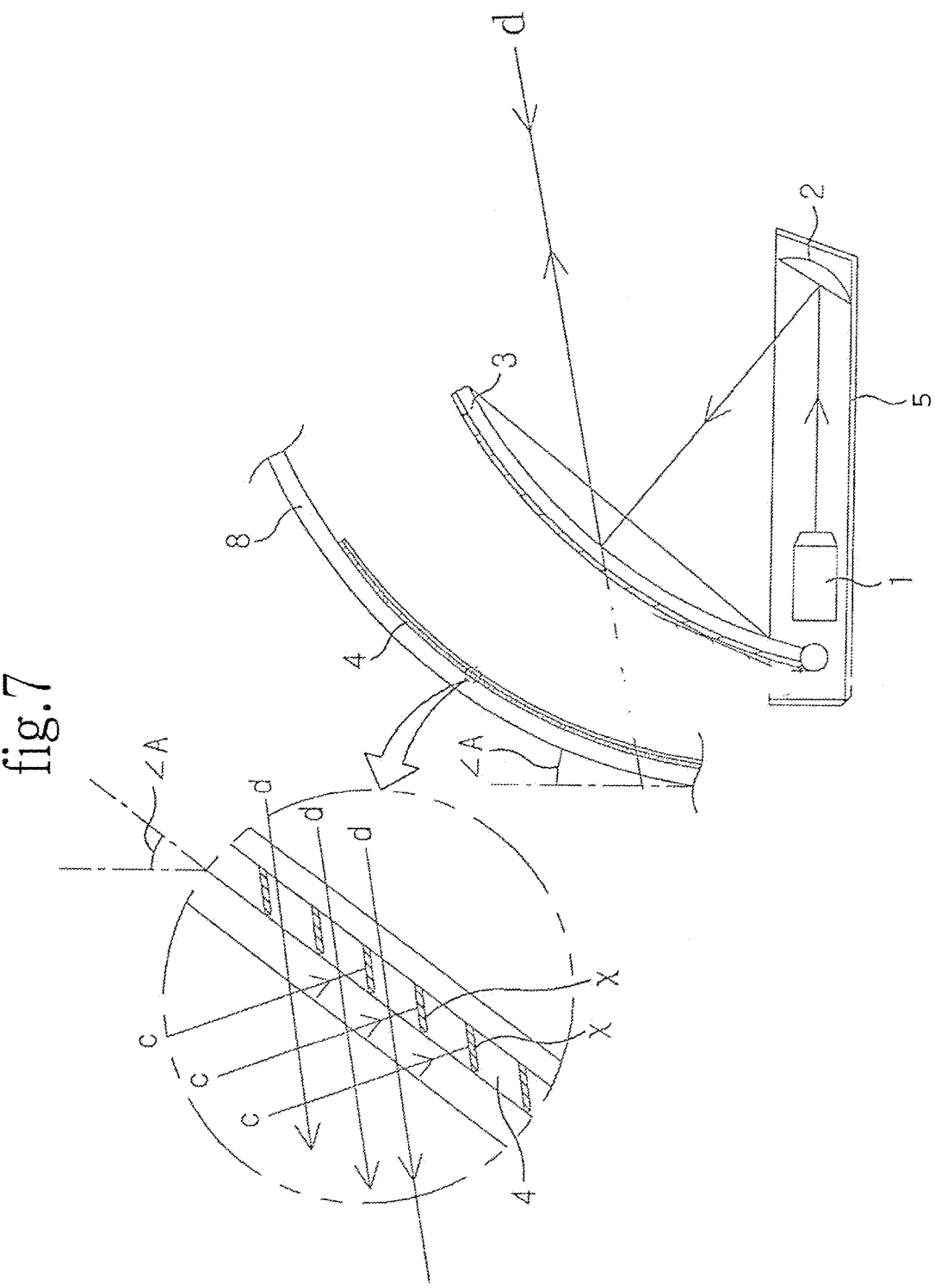
FIG. 7 is a view illustrating a shielding film that is attached on a vehicle window according to an embodiment of the present invention.

As shown in FIG. 7, an inclined angle of a vehicle window 8 is constant and the shielding film may be attached to the inside of the vehicle window 8 corresponding to a rear of the spherical half-transparent mirror.

Embodiment 6

Figure 8:
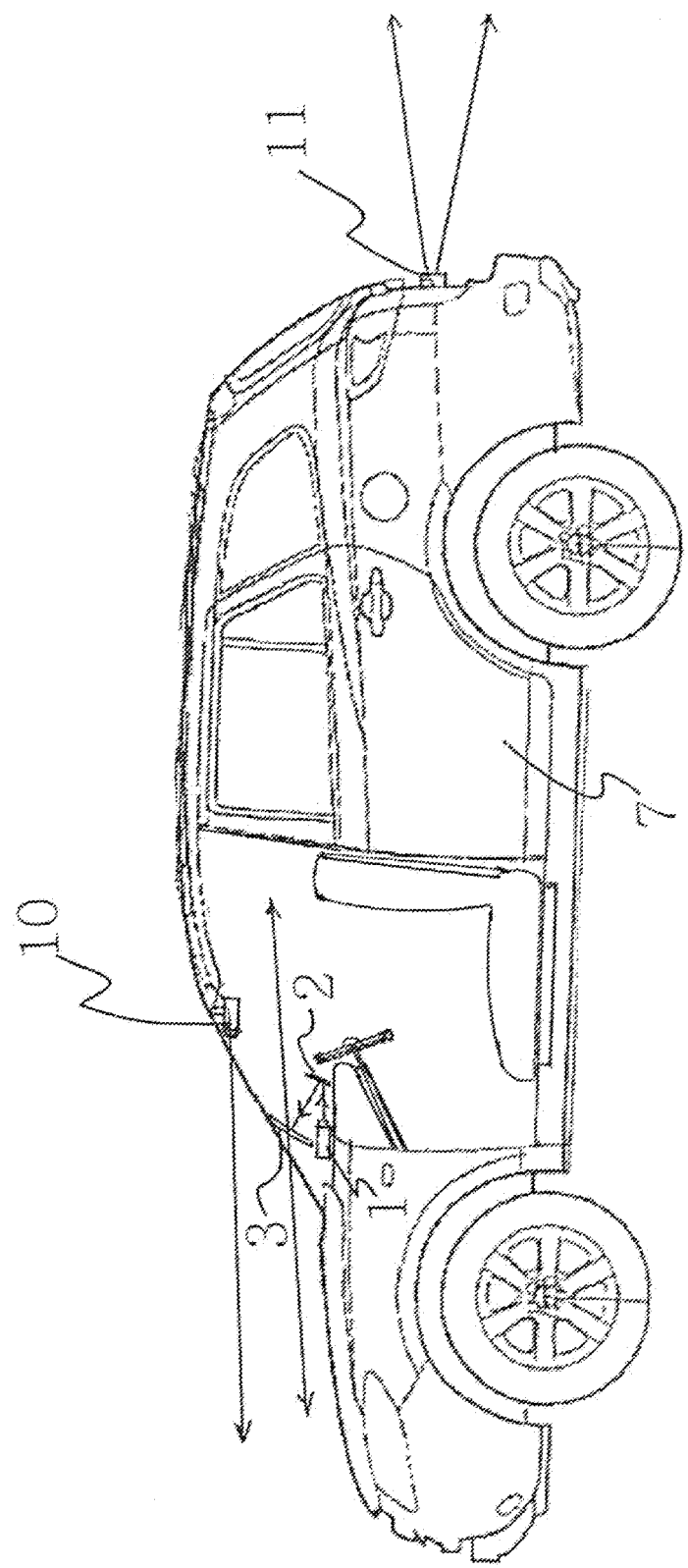
FIG. 8 is a view illustrating a telescope infrared camera and a rear camera that are provided on a vehicle according to an embodiment of the present invention.

As shown in FIG. 8, a camera device 10 such as telescope lens or infrared camera CCTV is arranged at an upper end of a driver' seat inside a vehicle 7, and outsight can be viewed therethrough. Specially, the infrared camera device is efficient when driving a vehicle at night or foggy day.

Further, as shown in FIG. 7, a rear camera 1 is attached to a rear of the vehicle 7 and an image on a rear of the vehicle appears automatically when the vehicle travels rearward.

Embodiment 7

Figure 9:
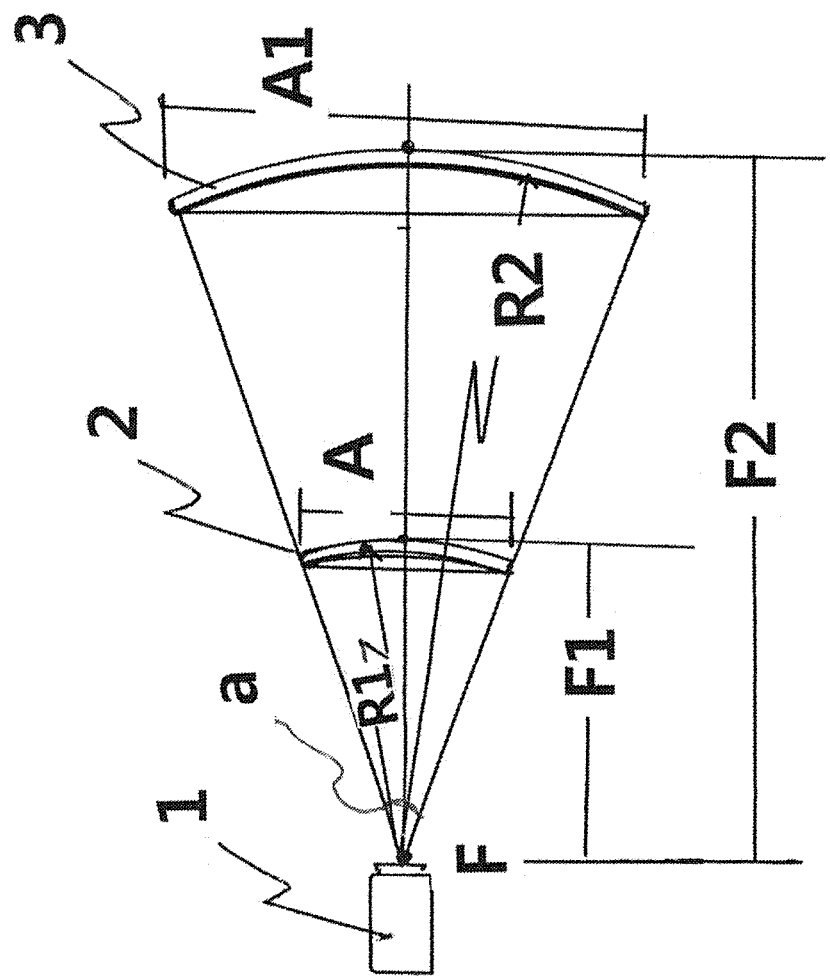
FIG. 9 is a view illustrating an optical operation performed in a concentric spherical system according to an embodiment of the present invention.
Figure 10:
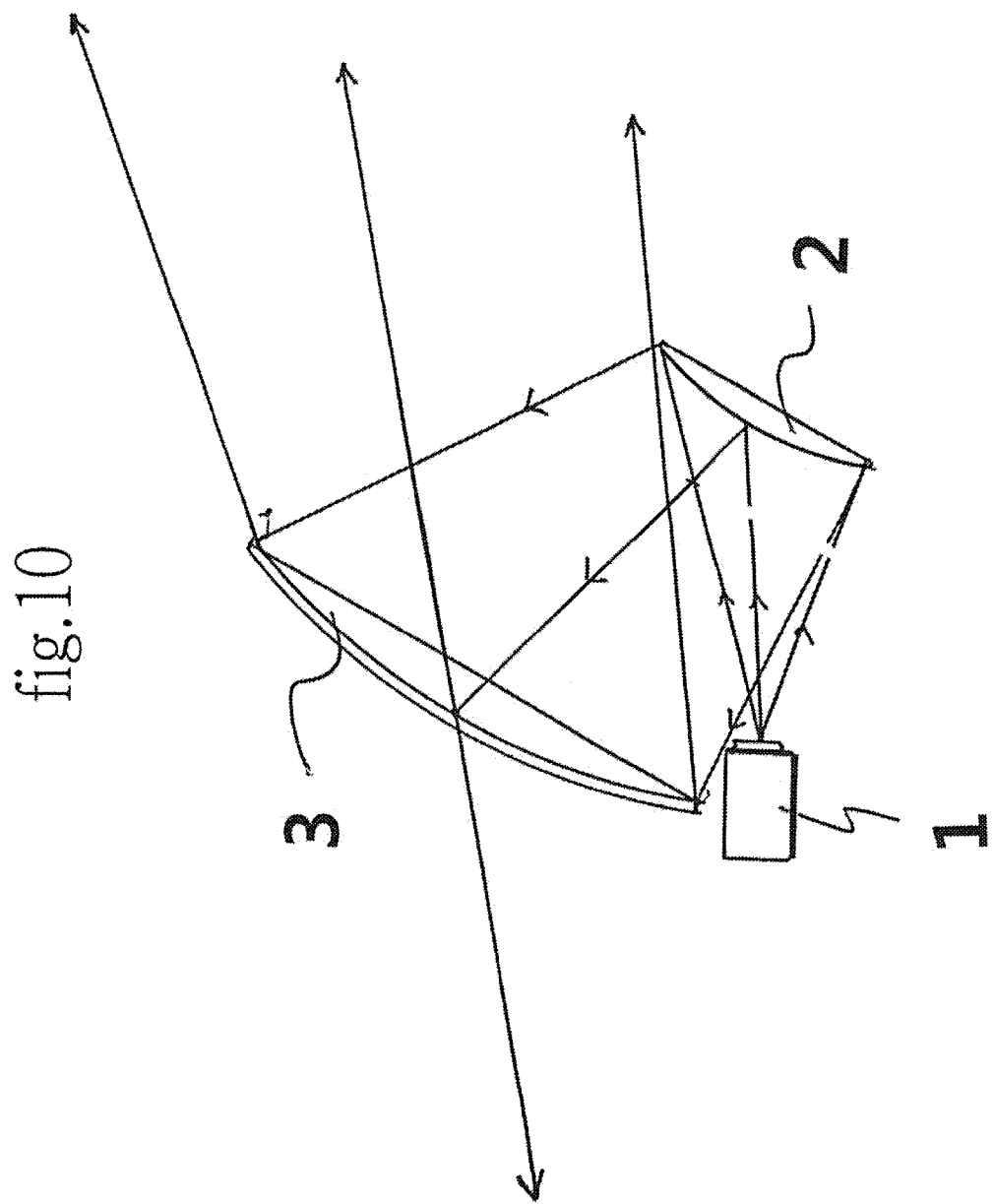
FIG. 10 is a view illustrating a concentric spherical system.

As shown in FIGS. 9 and 10, a spherical reflection screen 2 and the spherical half-transparent mirror 3 are provided as a concentric spherical surface. Here, the concentric spherical surface means that, as shown in FIG. 9, a curvature radius R1 of the spherical reflection screen 2 and a curvature radius R2 of the spherical half-transparent mirror 3 are configured to have a same common spherical center based on a location of a projection lens F of a projector unit 1.

That is, as shown in FIG. 9, F1 and R1 are same and F2 and R2 are same wherein the curvature centers of R1 and R2 are common based on F.

In this case, as shown in FIG. 9, a diameter of the spherical reflection screen 2 A and a diameter of the spherical half-transparent mirror 3 A1 are determined by a projection angle a of the projector unit 1 that is made from F point.

In this embodiment, as shown in FIG. 10, the spherical reflection screen 2 is formed as a convex form and thus the screen image that is projected from the projector unit 1 is not distorted and spot phenomenon is removed, thereby increasing brightness of the image.

A high brightness head-up display device of the present invention is featured by using the spherical reflection screen 2 and combining the spherical half-transparent mirror 3 and the shielding film 4.

Accordingly, the high brightness head-up display device of the present invention may be used for airplane, ship or the like in addition to a vehicle.

According to the present invention, the brightness of a spherical reflection screen having a reflection rate of 2-80% compared to a conventional screen having a reflection rate of 1% is increased to 2-80 times and further a projection distance of a projector unit corresponds to a focal distance of the spherical reflection screen, thereby removing a hot spot phenomenon and making image even bright.

Further, according to the present invention, as shown in FIG. 6, when the shielding film 4 is provided at a request inclined angle <A, the external light shielding surface X is in parallel to the installation angle of the shielding film and becomes a reflection surface or dark color so that the external light c incident from an outside of a vehicle is absorbed or reflected and the view angle d of a driver inside in parallel to the request inclined angle <A is transmitted itself, thereby viewing outside.

Meanwhile, according to the present invention, a external light shielding film is provided a rear of the half-mirror to shield external light and light is transmitted to the outside from inside, thereby increasing brightness of image as 4 times compared to a conventional screen.

Accordingly, the brightness is increased to 2-80 times at the spherical reflection screen 2 and it is increased to 4 times at a maximum level at the spherical half-transparent mirror 3, thereby implementing high brightness of image as a total of 8-320 times compared to a conventional screen.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A high brightness head-up display device comprises:
a case for housing components of the high brightness head-up display device, wherein the components comprise:
a projector unit provided at a first end of the case;
a spherical reflection screen provided in front of the projector unit at a second end of the case; and
a spherical half-transparent mirror provided above the projector unit at the first end,
wherein the spherical reflection screen has a curvature radius and is disposed within a margin of error of 30% of a projection distance (D1) of the projector unit and a focal distance of the spherical reflection screen having the curvature radius (R), and a surface reflection rate of the spherical reflection screen is 2-80%.

2. The high brightness head-up display device of claim 1, wherein a curvature radius (R1) of the spherical reflection screen and a curvature radius (R2) of the half-transparent mirror are concentric spherical surfaces based on a location of a projection lens (F) of a projector unit.

3. The high brightness head-up display device of claim 1, wherein a shielding film is attached to a rear of the half-transparent mirror, which shields external light incident at an oblique angle and transmits an internal driver's view sight to the outside.

4. The high brightness head-up display device of claim 2, wherein a shielding film is attached to a rear of the half-transparent mirror, which shields external light and permits light transmitted to outside from inside.

5. The high brightness head-up display device of claim 2, wherein a shielding film is arranged separately on a rear of the half-transparent mirror such that an arrangement angle thereof is adjusted, which shields external light and permits light transmitted to outside from inside.

6. The high brightness head-up display device of claim 2, wherein a shielding film is arranged on a glass window of a vehicle, at which the half-transparent mirror is disposed.

\* \* \* \* \*